H. PEARCE & F. SPENCE.
BED RECIPROCATING MECHANISM.
APPLICATION FILED MAY 12, 1915.

1,287,090.

Patented Dec. 10, 1918.
8 SHEETS—SHEET 1.

H. PEARCE & F. SPENCE.
BED RECIPROCATING MECHANISM.
APPLICATION FILED MAY 12, 1915.

1,287,090.

Patented Dec. 10, 1918.
8 SHEETS—SHEET 4.

Herbert Pearce, Fred Spence, Inventors
per
Rogers, Kennedy & Campbell, Attorneys H. PEARCE & F. SPENCE.
BED RECIPROCATING MECHANISM.
APPLICATION FILED MAY 12, 1915.

1,287,090.

Patented Dec. 10, 1918.
8 SHEETS—SHEET 5.

Herbert Pearce, Fred Spence, Inventors
per
Rogers, Kennedy & Campbell, Attorneys

FIG.7.

H. PEARCE & F. SPENCE.
BED RECIPROCATING MECHANISM.
APPLICATION FILED MAY 12, 1915.

1,287,090.

Patented Dec. 10, 1918.
8 SHEETS—SHEET 8.

Herbert Pearce, Fred Spence, Inventors
per
Rogers, Kennedy & Campbell, Attorneys

UNITED STATES PATENT OFFICE.

HERBERT PEARCE AND FRED SPENCE, OF BROADHEATH, ENGLAND, ASSIGNORS TO LINOTYPE AND MACHINERY LIMITED, OF LONDON, ENGLAND.

BED-RECIPROCATING MECHANISM.

1,287,090.  Specification of Letters Patent.  Patented Dec. 10, 1918.

Application filed May 12, 1915. Serial No. 27,506.

*To all whom it may concern:*

Be it known that we, HERBERT PEARCE and FRED SPENCE, subjects of the King of the United Kingdom of Great Britain and Ireland, and residing at Linotype and Machinery Works, Broadheath, in the county of Chester, England, have invented new and useful Improvements in Bed-Reciprocating Mechanism, of which the following is a specification.

This invention relates to mechanism for reciprocating parts of machines such as the beds of flat bed printing presses, and, as it is especially applicable for use in connection with those beds, the following description is restricted to that application, although it is to be understood that the invention may equally well be employed in connection with the reciprocation of the beds of planing and similar machines.

More particularly, the invention may be said to relate to that class of mechanism in which the control of the bed is transferred, through a connecting-rod operated reciprocating member or members, to and from a single crank pin which effects the slowing down, stopping, reversing and acceleration of the bed at opposite ends of the travel of the latter, and from which the said control is transferred to the normal bed-operating gear which operates the bed at uniform velocity during the actual printing stroke and the return stroke, and which class of mechanism is to be understood as distinct from mechanism in which a purely harmonic motion is imparted to a reciprocating member by a crank pin through a slotted yoke or similar connection.

To secure the best results in a flat bed printing press, it is necessary that the bed travel throughout its printing and return strokes at a uniform velocity and that, at the end of these strokes, and with as little strain as possible, the bed be brought gradually to a stop and have its direction of travel reversed and its velocity in the reverse direction gradually accelerated from the stop or zero up to the maximum. It is also of very great importance that, for the slowing down, stopping and reversal of the bed, as small a proportion as possible of the bed's travel be utilized, because the smaller that proportion, the greater will be the proportion available for printing, and consequently the greater will be the length (measured in the direction of the bed's travel) of the surface which can be printed at each cycle of the press. In presses having reciprocating mechanism of the above-named class, it has heretofore been proposed to transfer the control of the bed from the bed motion pinion to a slide rectilinearly reciprocated by the crank pin and connecting rod, which slide is caused to engage with and be disengaged from a member fast to the bed when the bed and slide are moving in the same direction. Conditions essential to the successful operation of such an arrangement are that the aforesaid transfers of control must be effected at instants at which the velocity of the slide is the same as that of the bed, and that from the instant of engagement to the instant of disengagement of the slide the velocity of the latter must continuously decrease from the normal velocity of the bed to zero and increase from zero upward until the normal velocity of the bed is again reached, and to attain this result it is desirable that the engagement and disengagement should be effected at instants at which the slide is traveling at its maximum velocity. Mechanism of the above-named class as heretofore proposed does not satisfy these conditions.

The invention is hereinafter described as applied to a known construction of press in which the bed is propelled through those parts of its travel which are of uniform velocity, preferably by two racks fast to the bed, with which two co-axial pinions respectively are alternately caused to mesh, one pinion for propelling the bed through its printing stroke and the other pinion for propelling the bed through the return stroke. These two pinions, although co-axial with each other, are not mounted on the same shaft, and they are rotated in relatively opposite directions by any convenient mechanism. The two pinions are moved into and out of mesh with, or out of the tracks of, their respective racks by suitable cams, and they are moreover capable of being both simultaneously disengaged with those racks. This particular arrangement of racks and pinions is not, however, essential to the carrying out of the said invention, which can be applied to any rack and pinion arrangement in which the travel of the bed in one direction at uniform velocity would, if the reversal were carried out according to the hitherto known arrangements above referred to, extend over a period occupied by not more than one complete rotation of the bed driving pinion.

The object of the present invention is to so construct mechanism of the just-mentioned type as to reduce the proportion of the rotation of the crank devoted to the reversing operation, and correspondingly to increase the proportion of the rotation of the driving pinion to be utilized for driving the bed at uniform velocity, and, consequently, the proportion of the complete travel of the bed available for the actual printing operation; attempts have been made to secure a similar result in connection with reversing mechanism employing more than one crank pin, and it is to be understood that the present invention has no reference to any such mechanism.

The before-mentioned increase of the travel of the bed at uniform velocity, according to the example of the invention hereinafter described, is obtained by the two pinions, while in mesh with their respective racks, rotating through angles of, say, $2^a$ degrees beyond the 360 degrees which would carry the bed through the normal distance, the angle $a$ being that hereinafter defined.

The invention will now be described by reference to the accompanying drawings in which:—

Figs. 8 and 9 are diagrams hereinafter more particularly referred to.

Like reference characters are used for indicating like or similar parts throughout the several figures of the drawings.

Figure 1:
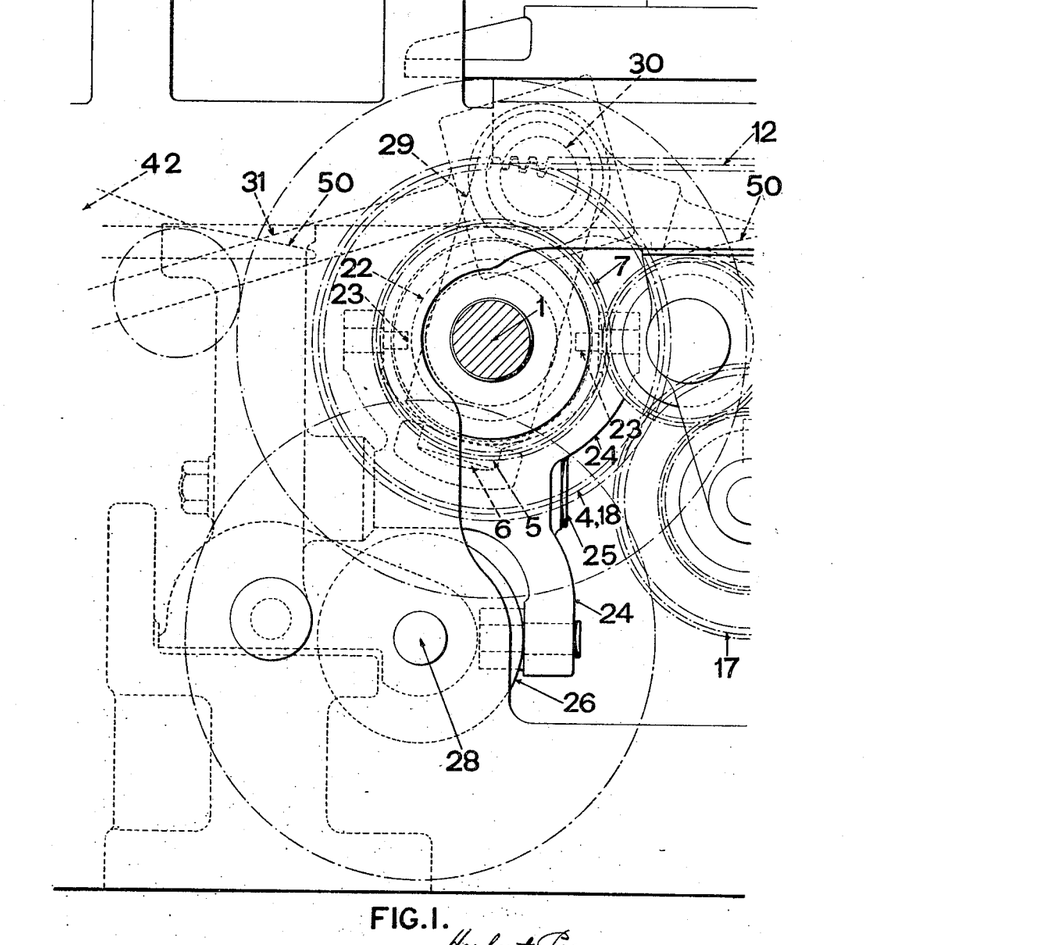
Figures 1 and $1^a$ together form a side elevation of part of a printing press with the improved bed-operating mechanism applied thereto.
Figure 1A:
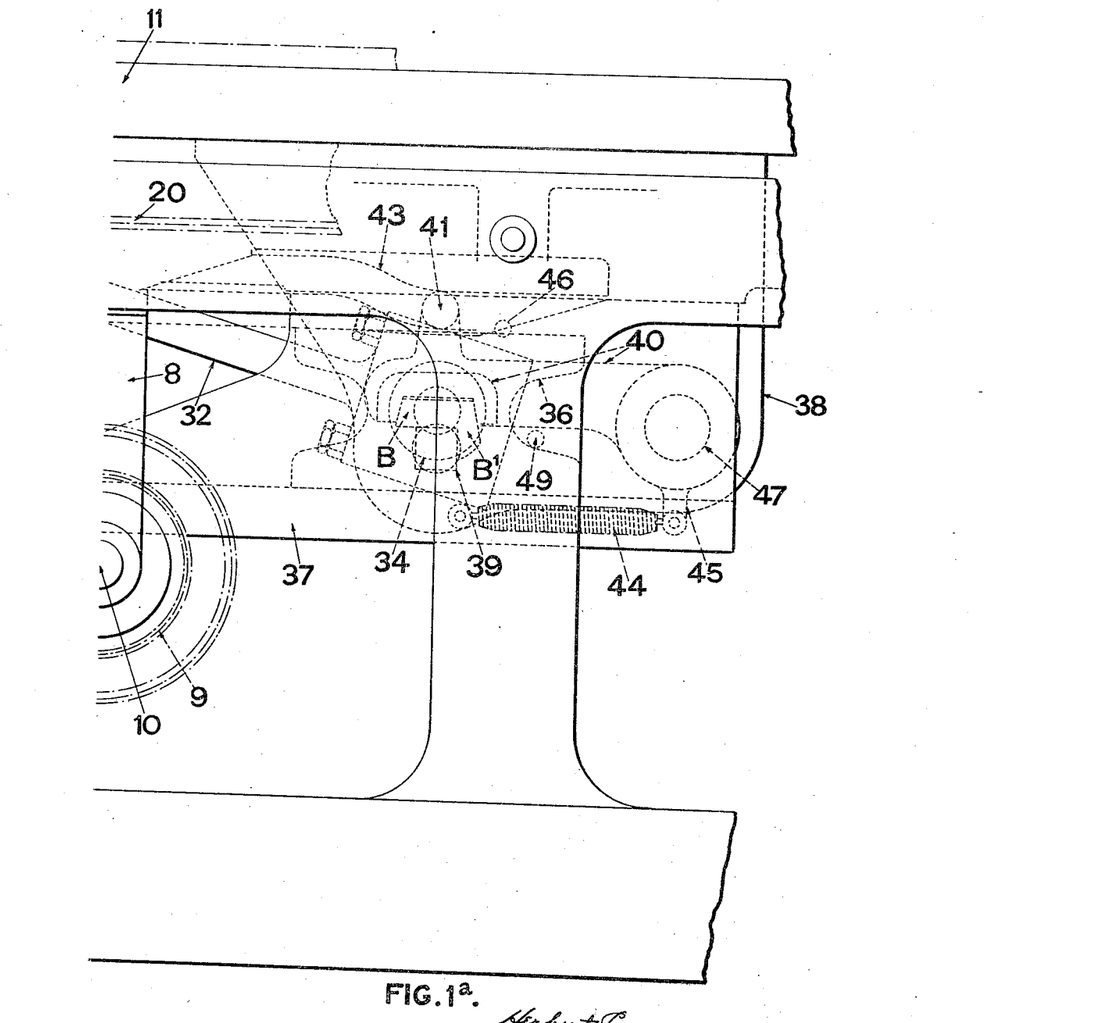
Figure 2:
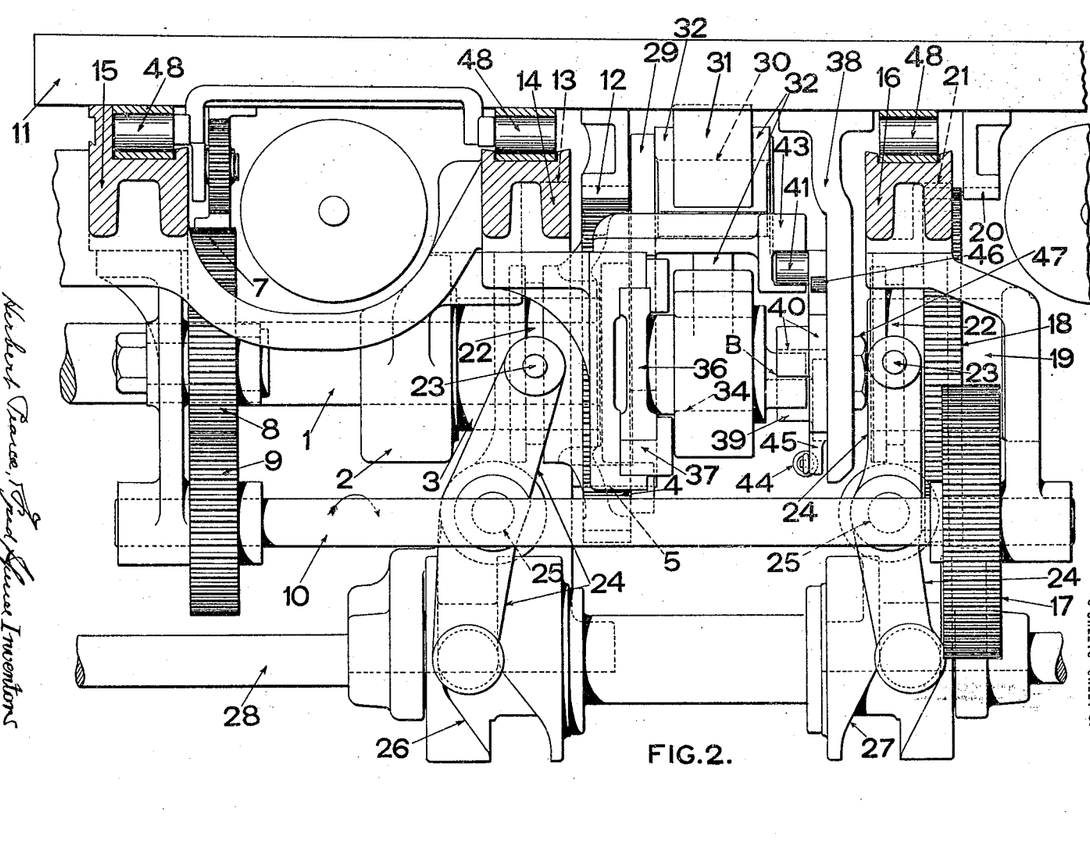
Fig. 2 is an end elevation of a portion of the same.

Referring first to Figs. 1, $1^a$ and 2, 1 is the bed motion shaft which is rotatable in suitable bearings, only one of which, viz., that marked 2 is represented, see Fig. 2. The bearing 2 has fast to it an extension or sleeve 3 on which is mounted the bed pinion 4 with a capacity of moving both rotatably and axially thereon. The pinion 4 is maintained in constant driving connection with the shaft 1, whatever be the position of the former upon the sleeve 3, by the well-known arrangement of a crank 5 rigidly secured to the inner end of that shaft and engaging with a groove or recess 6 formed in or on the said gear wheel, as shown in dotted lines in Figs. 1 and 2.

The bed motion shaft 1, has rigidly secured thereon a spur pinion 7, which, through an intermediate wheel 8, drives a gear wheel 9 fast on a counter shaft 10 through which, as hereinafter described, the return or non-printing stroke of the bed 11 is effected.

The bed pinion 4 is capable of being moved axially along the sleeve 3 into two different positions in one of which, viz., that in which it is shown in Fig. 2, it is in engagement with the bed rack 12 which is fast to the underside of the bed 11, and in the other of which it is at the left-hand side, as viewed in Fig. 2, and out of the path of the said bed rack; in this last-named position the upper portion of the bed pinion 4 is located, and free to rotate, in a recess 13, indicated in dotted lines in Fig. 2, in the adjacent part 14 of the press frame, this part 14, like those marked respectively 15, 16, presenting at its upper surface, as ordinarily, a track for the rollers 48 which support the bed 11 throughout its longitudinal travel.

The rack 12, being that which propels the bed 11 throughout the part of its printing stroke which is of uniform velocity, is situated as nearly as possible at the center of the width of the said bed so as to minimize any tendency of the bed to twist under the strain exerted on it by the bed pinion 4.

The before-mentioned countershaft 10 has fast on it a spur wheel 17 which is in constant driving connection with a bed pinion 18 rotatable and axially movable on a short fixed shaft or stud 19, axially alined with, but independent of the bed motion shaft. The bed pinion 18, which is of the same diameter as the bed pinion 4, by its axial movement on the stud 19, is capable of being moved into and out of engagement with the bed rack 20, which, like the before described bed rack 12, is fast to the underside of the bed 11. When the bed pinion 18 is out of engagement with the bed rack 20 (which is the condition in which it is shown in Fig. 2) the upper part of it is received, and free to rotate, in a recess 21, indicated in dotted lines in Fig. 2.

By the before-described apparatus the two bed pinions 4 and 18 are constantly rotated in opposite directions and consequently when, alternately, they are brought into mesh with their respective bed racks 12, 20, the bed 11 is traversed in relatively opposite directions. Fig. 2 represents the bed pinion 4 enmeshed with the bed rack 12 and the bed pinion 18 disengaged from its bed rack 20, which is the condition obtaining during the printing stroke of the bed 11; during the return or non-printing stroke of the bed 11, the bed pinion 4 is out of engagement with its bed rack 12, and the bed pinion 18 is in engagement with its bed rack 20. As the amount of resistance to the travel of the bed 11 during its return or non-printing stroke is less than that to be overcome during the printing stroke, the bed pinion 18 and bed rack 20 can, as shown in Fig. 2, be of lighter construction or less width than that of the pinion 4 and rack 12.

The bed pinions 4 and 18 receive their axial movement through the following means: In the exterior of the boss of each such pinion there is provided an annular groove 22 with which are engaged two gibs 23 carried by the upper arms of a bifurcated lever 24 adapted to be rocked about a stationary pivot 25, by a grooved cam 26 or 27, rigidly secured to a cam shaft 28 to which continuous rotary motion is imparted by any suitable gearing. The cams 26, 27, operate the levers 24 through rollers on the lower arms of the latter engaging with the grooves of the former, and the said cams are so constructed that the bed pinions 4, 18, are moved alternately into and out of operative alinement with their respective bed racks 12, 20, during the periods occupied by the slowing down, stopping, reversing and accelerating of the bed's motion, the pinion so moved out of engagement being maintained in that condition throughout each such period. So far as this cam mechanism is concerned, the arrangement just described is or may be substantially the equivalent of that heretofore used for a like purpose, the only material difference being that the cams 26, 27, are arranged to maintain the bed pinions 4, 18, in gear each with its respective rack 12, 20, throughout a rotary motion of rather more than 360 degrees, say 360+2$a$ degrees.

To the inner end of the bed motion shaft 1 there is rigidly secured a plate 29 with which is integral, or to which is rigidly attached, the before mentioned crank pin 30 on which are pivoted the meeting ends of two connecting rods or links 31, 32. The outer ends of the rods 31, 32, are pivoted upon studs or pins 33, 34, respectively, each of which is integral with, or fast to, a block or slide 35, 36, which is capable of sliding in stationary horizontal guides 37, in a direction parallel with the movement of the bed 11. Each of the slides 35, 36, or the stud 33 or 34 thereon, is provided with a device A or B herein termed a hook having a horizontal member and a vertical member $A^1$ or $B^1$, the latter members on the two slides 35, 36, being situated in relatively opposite positions, that is to say, as shown in Figs. 3, 4, 5 and 6, both of the vertical members $A^1$, $B^1$, are located at the outer ends of the hooks A, B, relatively to the bed motion shaft 1.

To the underside of the bed 11, at or about the center of its length and movable between the two pinions 4, 18, and transversely to their common axis, there is rigidly secured a bracket or hanger 38, to which is rigidly secured what is herein termed a reversing stud 39 which is capable of engaging with the vertical faces of the aforesaid vertical members $A^1$, $B^1$, when the control of the bed 11 has to be transferred from the pinions 4, 18, to the crank pin 30, that is to say, at those instants at which the reversing stud 39 and the vertical members $A^1$, $B^1$, are traveling at equal velocity. On a stud 47 fast to the hanger 38 there is pivoted a yoke or latch 40 which is adapted to embrace the upper part or horizontal member of each of the two hooks A, B, and which, when so engaged, insure the bed 11 moving as if in one piece with the particular hook A or B with which it is, for the time being, engaged.

The latch 40 is provided with an upstanding arm carrying an anti-friction roller 41, which engages with a cam race 42 or 43, see particularly Figs. 3 to 6, at or near the respective end of the bed's travel so as, at the required times, to move the latch into and out of engagement with the hook A or B. At the times at which the latch is not acted upon by the cam races 42, 43, it is supported in its higher position by a spring 44, Figs. 1$^a$ and 2, attached, at one end, to the hanger 38 and, at the other end, to an arm 45 extending downwardly from the boss of the latch 40. The movement of the latch 40 under the action of the spring 44 is limited by a pin or stop 46 fast to the hanger 38, this stop being so positioned that the latch is maintained at the level of the higher portions of the cam races 42, 43, at all such times as the roller 41 is not engaged with those cam races, that is to say, during the period at which it is passing from one to the other of the said cam races; by this arrangement of spring 44 and stop 46, the roller 41 is maintained in proper position to enter the cam race 42 or 43 as the bed 11 approaches the termination of its printing or non-printing stroke respectively.

To prevent any damage being caused by reason of the latch 40 being deprived of the support given to it by the spring 44 (say by breakage of the latter), the hanger 38 has rigidly fixed thereto a stop 49 which underlies the said latch and would, in the event of such breakage, support the latch during its travel between the two cam races 42, 43, in such a position as would enable the roller 41 thereon to travel up a ramp 50 provided on the inner end of each such cam race, these ramps serving to guide the said roller into the higher portions of the respective cam races.

The operation of the before-described mechanism may be described as follows, it being assumed that the two bed pinions 4 and 18 are rotated in respectively anti-clockwise and clockwise direction, as viewed in Figs. 1, 3, 4, 5 and 6, and that, as a convenient stage from which to start such description, the bed 11 has just reached the uttermost limit of its non-printing stroke, and is just about to reverse and start on its printing stroke.

Figure 7:
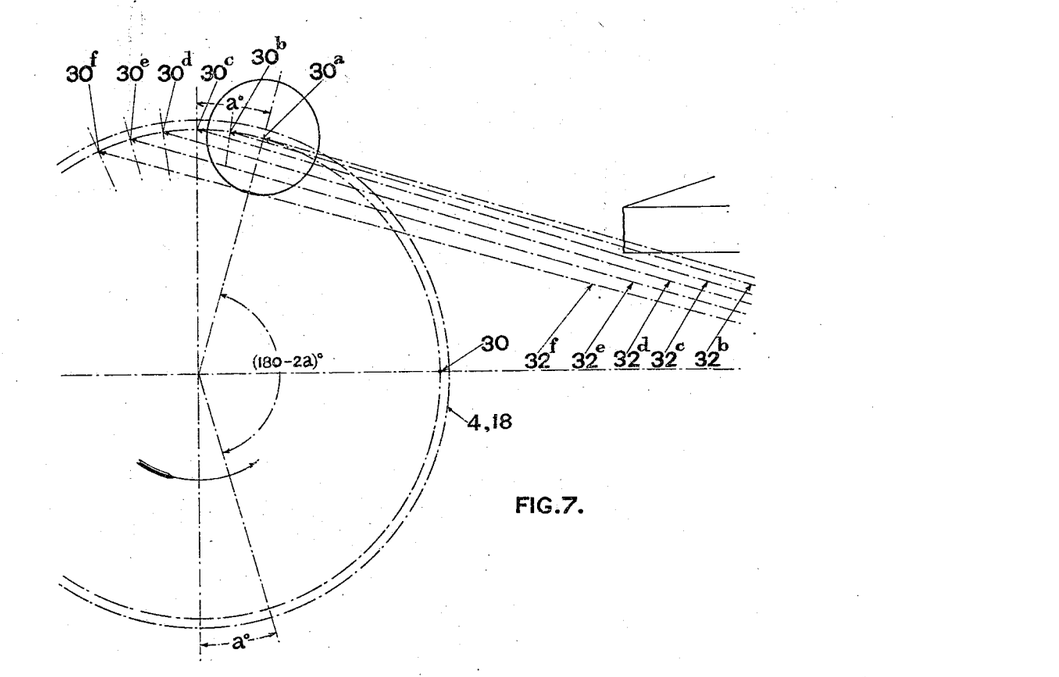
Figs. 7 and $7^a$ together form a diagrammatic view showing successive positions assumed by certain of the bed-operating organs during the period of acceleration of the latter's travel from zero and during the earlier part of its travel at normal speed.

At this instant the crank pin 30 is at the right-hand side of, and in the same horizontal plane as that containing the axis of the bed motion shaft 1, and the reversing stud 39, hook B and latch 40 are mutually engaged in the manner represented at the right-hand end of Fig. 7$^a$, the said latch, at this stage, being held in engagement with the hook B, antagonistically to the spring 44, by the lower or outer end of the cam race 43 acting on the roller 41.

Throughout the angular movement of the crank pin 30 through the next, say, 90—$a$ degrees, the reversing stud 39, hook B and latch 40 travel in mutual engagement as if in one piece with each other at a speed gradually accelerating from zero to maximum, the said stud, hook and latch at the completion of that angular movement being in the positions in which they are respectively identified in Fig. 7$^a$, by the references 39$^a$, B$^a$ and 40$^a$. From this point onward the parts 39, B, and 40 become farther and farther separated from each other, and during such separation, they are caused to assume certain different relative positions, five of which are arbitrarily selected for illustration in Fig. 7$^a$; in this figure and Fig. 7 the references herein termed normal references which have been employed for denoting the respective organs in the other figures, appear with superiors alphabetically arranged to correspond with the order of the positions which those organs respectively occupy. Thus, the positions respectively occupied by the organs 39, B, and 40 at a certain instant, have already been identified by the added superiors "a," and the positions respectively occupied at the same instant, by the other organs embraced in Figs. 7 and 7$^a$, are readily identifiable by the superiors "a" added to their normal references. In other words, at the instant at which the reversing stud 39 is at the position indicated at 39$^a$, all of the organs 30, 32, 34, 39, B, 40 and 41 are correspondingly at the positions in which they are respectively indicated at 30$^a$, 32$^a$, 34$^a$, 39$^a$, B$^a$, 40$^a$, and 41$^a$. To carry this description a further stage onward, it is explained that when the reversing stud 39 is at the position indicated at 39$^b$, all of the organs 30, 32, 34, 39, B, 40 and 41, are correspondingly at the positions in which they are respectively indicated at 30$^b$, 32$^b$, 34$^b$, 39$^b$, B$^b$, 40$^b$ and 41$^b$.

Figure 3:
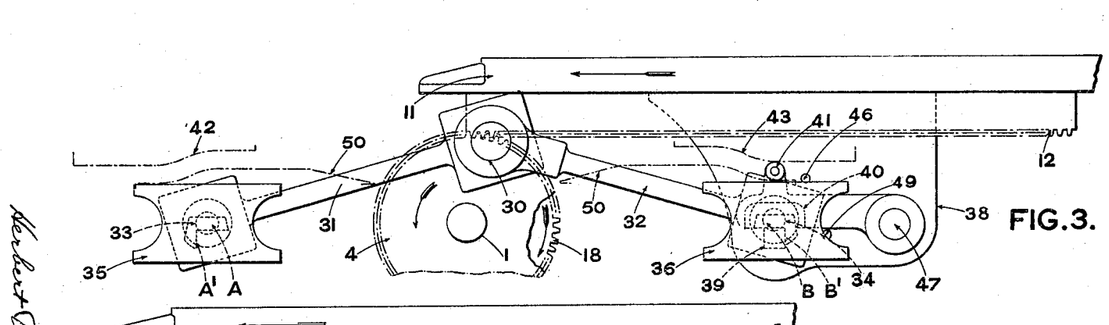
Figs. 3, 4, 5 and 6 are four diagrammatic side elevations of certain organs of the mechanism in the different positions respectively assumed by them at four different stages of their cycle of operation.

As previously mentioned, when the several organs indicated in Figs. 7 and 7$^a$ reach the positions respectively designated by the superiors "a," in those figures, they, and consequently the bed 11 also, have attained their maximum speed, equal to the peripheral speed of the bed pinion 4, and it is at this stage that the rack 12, as shown in Figs. 1 and 3, runs into mesh with and is operatively engaged by the pinion 4, which had previously been moved laterally into the path of that rack, as hereinafter explained, and which, immediately thereafter, carries the bed 11 through that portion of its printing stroke which is of uniform velocity. From this stage onward the hook B travels slower than does the bed 11, and consequently, as shown in Fig. 7$^a$, the reversing stud 39, and latch 40, carried along with the bed 11, move ahead of the said hook, the latch 40, at the same time, being raised out of engagement with the hook, through the action of the ascending part of the cam race 43 on the roller 41. By the time that the roller 41 reaches the higher portion or level of the cam race 43, the latch 40 has been raised above the level of the hook B, as indicated at 40$^e$ and 40$^f$, Fig. 7$^a$, and can then travel unobstructedly over the said hook.

Figure 5:
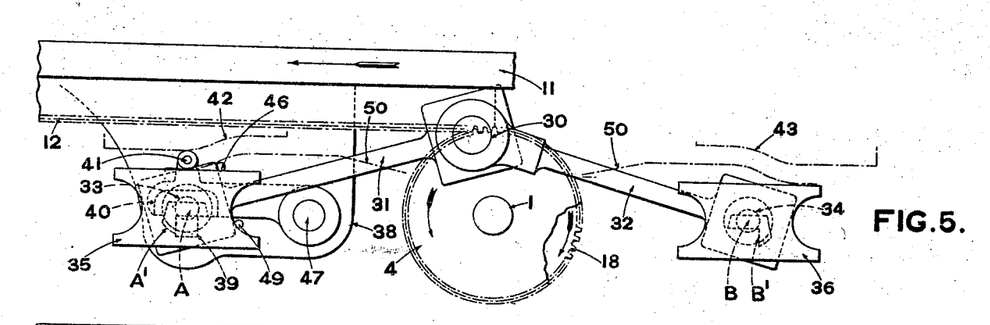
Figure 6:
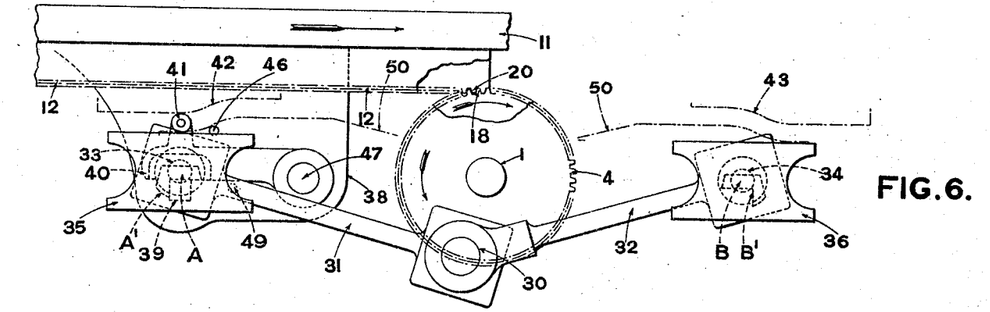

As the bed 11 approaches the end of its printing stroke, or more definitely stated at or about the instant at which the bed motion shaft 1 and pinion 4 complete the 360+2$a$ degrees of angular motion from the position at which the bed started the portion of its printing stroke of uniform velocity, the bed rack 12 runs out of mesh with the pinion 4, and the hook A is traveling at the same velocity as the bed, and at or about that instant the reversing stud 39 abuts against the vertical member A$^1$ of that hook, and the roller 41 (which by that time, had already been depressed by passing along the descending portion of the cam race 42), completes the engagement of the latch with the hook A, thus, for the time being, locking the bed 11 to, and placing it under the control of the crank pin 30; this is the condition in which the respective organs are represented in Fig. 5. The slowing down, stopping, reversing and speeding up of the bed now take place during the next ensuing angular motion of say 180—2a' degrees of the crank pin 30, that is to say, the movement of the crank pin to the position in which it is represented in Fig. 6, just as though the said crank pin were in permanent operative connection with the bed, and at any part of the time occupied by the just-named angular movement of the crank pin, the cams 27, 26 effect a lateral movement of the bed pinions 18 and 4, to bring the former (18) into a position in which it will subsequently be engaged by the rack 20 during the next ensuing or already started non-printing stroke, and the latter (4) out of the path which will be pursued by the rack 12 during that stroke. At the completion of the just mentioned angular motion of 180—2a degrees of the crank pin 30, the hook A is again traveling at the same velocity as is the bed 11. At that juncture the bed rack 20 runs into mesh with and is operatively engaged by the pinion 18, and the mutual separation of the stud 39, hook A and latch 40 commences, the latch being raised clear of the hook A by the ascending part of the cam race 42, in the same manner as it was previously raised by the cam race 43 at the commencement of the printing stroke, as hereinbefore fully described in connection with Figs. 7 and 7ª.

The bed 11 is then traversed through its non-printing stroke at uniform velocity by the rack 20 and pinion 18, and at or about the instant at which the pinion 18 completes say 360+2a degrees of angular motion from the position at which the bed started the portion of its non-printing stroke of uniform velocity, the bed rack 20 runs out of mesh with the pinion 18 and the hook B is traveling at the same velocity as the bed, and at or about that instant the reversing stud 39 abuts against the vertical member B¹ of that hook, and the roller 41 (which, by that time, had already been depressed by passing along the deflected part of the cam race 43) completes the engagement of the latch 40 with the hook B, thus, again, placing the bed 11 under the control of the crank pin 30. The slowing down, stopping, starting on the printing stroke, and speeding up of the bed 11 now take place during the next say 180—2a degrees of angular motion of the crank pin 30, that is to say, the 180—2a degrees angle marked in Fig. 7, and at any part of the time occupied by this angular movement of the crank pin, the cams 26, 27, effect a lateral movement of the bed pinions 4 and 18, to bring the former (4) into a position in which it will subsequently be engaged by the rack 12 during the next ensuing or already started printing stroke, and the latter (18) out of the path which will be pursued by the rack 20 during that stroke. At the conclusion of the just-mentioned 180—2a degrees angular motion of the crank pin 30, the respective organs are once again in the positions hereinbefore identified by the superiors "a" in Figs. 7 and 7ª and ready to repeat the previously described cycle of operations.

Figure 4:
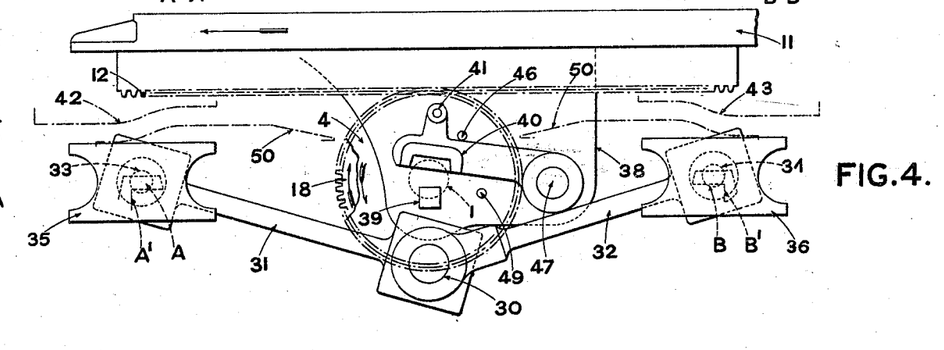

Fig. 4 represents the condition of the improved bed motion at the stage at which the bed 11 has completed one half of its printing stroke, that is to say, the stage midway between those hereinbefore described with reference to Figs. 3 and 5.

In the conversion of circular or rotary motion into a straight line motion by means of a rotating crank pin 30 and a connecting rod 31, it is well known that the velocity of the slide 35 varies from point to point along its travel.

Figure 8:
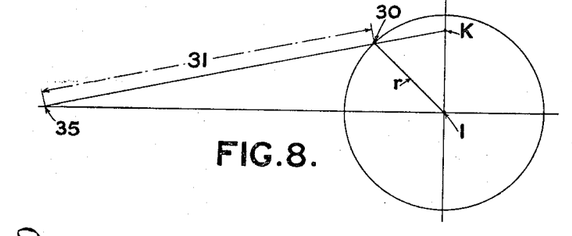

Let the crank pin 30 rotate with uniform angular velocity, and let V=the peripheral velocity of the crank pin, then, according to a well known construction for obtaining the velocity of the slide 35, let the crank radius $r$ of Fig. 8 represent to some scale the velocity V of the crank pin 30 and for any position of the crank pin let the line of the connecting rod 31, produced if required as in Fig. 8, intersect the vertical through 1 (the axis of the bed motion shaft 1) at a point K, then the length 1K will represent the velocity of the slide 35 to the same scale as that at which the radius $r$ represents the velocity V of the crank pin 30.

The angular position of the crank pin 30 and the position of the slide 35 in which its velocity is a maximum can be determined by a tedious calculation, but a sufficiently close approximation is that which assumes the velocity of the slide 35 to be at its maximum when the connecting rod 31 and crank radius $r$ are at right angles with each other. In the application of the mechanism according to the present invention to the reversal of the bed of a printing press, it is obvious that, as aforesaid, the slide 35 can be satisfactorily engaged with the bed only at that instant at which it is moving in the same direction as the bed, and at the same or approximately the same velocity as that of the bed. The velocity of the bed will be that of the pitch line of its driving pinion and whatever the crank radius $r$ may be, since that radius is moving with the same angular velocity as the bed driving pinion, at the position or instant of engagement between the slide 35 and the bed, the intercept 1K must be equal to the pitch line radius of the pinion.

From the above it will be seen that, in order to fully appreciate the essence of the present invention, it is necessary to ascertain the precise conditions which govern the relationship between the lengths of the connecting rod and crank radius. For this purpose consider first the case in which only one reversing latch is to be used, as has been hereinbefore assumed in connection with Figs. 1 to 7a, and with special reference now to Fig. 9.

Figure 9:
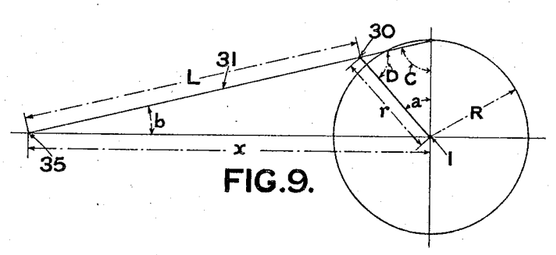

Let $R$ = radius of pitch line of bed driving pinion
Let $a$ = angle of crank radius $r$ assumed with vertical line when retardation is to begin
Let $r$ = radius of crank arm
Let $x$ = half travel of bed at its uniform velocity (determined by the fact that, one latch only being employed to effect the reversal of the bed at either end of its travel, the distance between the two positions in which the said latch engages with the respective hooks A and B must be equal to the travel of the bed at uniform velocity, and this distance must obviously equal the pitch line circumference of the bed driving pinion multiplied by $$\frac{360 + 2a}{360};$$

hence the distance $x$ must be equal to half the travel of the bed at uniform velocity; this being the case, the length of connecting rod is dependent upon the latter distance)
Let $b$ = angle of connecting rod with horizontal line
Let $L$ = length of connecting rod 31
Then $$x = \pi R\left(\frac{180+a}{180}\right). \quad \tan b = \frac{R}{X} = \frac{180}{\pi(180+a)}$$

Angle $C = (90-b)$. Angle $D = (90+b-a)$. Also $R \sin C = r \sin D$, hence $$r = \frac{R \sin C}{\sin D}.$$

When $r = R$ then $C = D$ or $(90-b) = (90+b-a)$, whence $a = 2b$.

When $a = b$ the angle which the connecting rod 31 makes with the crank radius $r$ will be a right angle and $$r = R \cos a = x \sin a = \pi R \frac{(180+a)}{180} \sin a,$$

hence $$\tan a = \frac{180}{\pi(180+a)}.$$

The last-named condition in which $a$ is assumed to equal $b$, is that in which, as previously stated, the maximum velocity of the slide 35 is equal to the normal or maximum velocity of the bed, and owing to the fact that when the velocity of the slide 35 is at its maximum, then its acceleration is zero, this condition is the best to employ. The length L of the connecting rod 31 in any case is determined from the relation $$L \sin b = r \cos a$$

hence $$L = \frac{r \cos a}{\sin b}.$$

Now, if the crank radius $r$ be greater than $R \cos a$, then the slide 35 will have a maximum velocity greater than that of the bed and a reversing stud on the bed could not be used in conjunction with an engaging surface on the slide, inasmuch as the slide 35, for a period prior to its engagement with the bed, would be traveling in the same direction as the latter but at a greater velocity, and the said engaging surface would come into violent contact with the reversing stud. If the reversing stud be discarded, as it is possible it may be, the just named difficulty does not arise and the crank radius $r$ could, without series disadvantage, be appreciably greater than the radius of the bed pinion, with a consequent increase in the length of the printing stroke and a shortening of the period of reversal. It is, preferred, however, to use the reversing stud 39 in the manner previously indicated, for the reason that the mutually engaging surfaces of it and the hook A or B can be perpendicular to the direction of travel of the bed 11, and therefore there is no wear of those surfaces; when the reversing stud 39, and consequently also the vertical members $A^1$ $B^1$, are dispensed with, the strains are taken on the inclined engaging faces of the latch 40 and hook A or B, and these strains would re-act on the cam races 42, 43, through the roller 41.

If the crank radius $r$ be less than $R \cos a$, then the maximum velocity of the slide 35 will be less than the velocity of the bed so that the engagement of the slide with the bed cannot be effected without the accompaniment of a sudden check equal to the difference of the two velocities, and whether a reversing stud be used or not, the engagement must necessarily be accompanied by more or less shock, which, at high speeds, might have disastrous results. In any case it would not be practicable or safe to reduce the crank radius $r$ below the value $R \cos a$ as found for the ideal case, except to a very trifling extent.

It will be understood that the before-described mechanism is capable of various modifications, such, for instance, as the employment of a rectilinearly instead of a curvilinearly movable latch, without departing from the essential features of the invention, the basic principle of which may be said to involve a purely-rectilinear motion of varying velocity of a body such as a slide 35 produced through a connecting rod and a rotating crank, and the utilization of such motion for effecting the reversal of motion of a rectilinearly reciprocating bed, within a period which is less than one half of the period occupied by one rotation of the crank.

The before described apparatus can be adjusted for taking up wear, by tightening the brasses or parts of the connecting rods 31, 32, which are in pivoted connection with the crank pin 30 and slides 35, 36.

As hereinbefore mentioned, the present invention, besides being applicable to printing presses, is also applicable to other machines in which an organ is reciprocated similarly to the bed of a flat bed printing press, and for that reason it is to be understood that the word "bed" as used in this specification and claims, is intended, wherever the context admits of it, to include or apply to all of such organs.

Having described our invention, we declare that what we claim and desire to secure by Letters Patent is:—

1. In bed reciprocating mechanism, the combination with a reciprocating bed and two co-axial spur pinions adapted to move it at uniform velocity in respectively opposite directions, of a crank adapted to rotate about the axis common to both pinions, two connecting rods, two slides each connected to the same crank by one of the said rods and adapted to be reciprocated thereby at velocities varying downwardly to and upwardly from zero, a hook having a vertical member and a horizontal member fast to each of the two slides, a stud rigid with the bed and adapted, by reason of the relative motion of the bed and slide, to engage with and disengage from the vertical member of each of said hooks, a latch pivotally connected to the bed and accompanying it throughout its travel, and means adapted to automatically effect the engagement of the latch with and its disengagement from the horizontal member of each of the said hooks, the respective engagements and disengagements taking place at instants at which the velocity of the slide is at a maximum and equal or approximately equal to that of the bed.

2. In bed-reciprocating mechanism, the combination with a reciprocating bed and two coaxial spur pinions adapted to move it at uniform velocity in respectively opposite directions, of a crank adapted to rotate about the axis common to both pinions, two connecting rods both journaled on the said crank, two slides each connected to that crank by one of the said rods and adapted to be reciprocated thereby at velocities varying downwardly to and upwardly from zero, a two-member hook fast to each of the two slides, a stud rigid with the bed and adapted, by reason of the relative motion of the bed and slide, to engage with and disengage from one member of each of the said hooks in alternation, a latch pivotally connected to the bed and accompanying it throughout its travel, and means adapted to automatically effect the engagement of the latch with and its disengagement from the other member of each of the said hooks in alternation, the respective engagements and disengagements of the stud and latch with and from the hooks being effected at instants at which the velocity of the respective slide is at a maximum and equal or approximately equal to that of the bed.

In witness whereof we have hereunto set our hands in the presence of two witnesses.

HERBERT PEARCE.
FRED SPENCE.

Witnesses:
HENRY CARTER PUGH,
HAROLD SOUTHWORTH.